US010596487B2

(12) United States Patent
Levine et al.

(10) Patent No.: US 10,596,487 B2
(45) Date of Patent: Mar. 24, 2020

(54) METHODS AND APPARATUS FOR CLARIFICATION OF PYROLYSIS OILS

(71) Applicant: RJ LEE GROUP, INC., Monroeville, PA (US)

(72) Inventors: Alan M. Levine, Monroeville, PA (US); Steven J. Monaco, Venetia, PA (US); Richard J. Lee, Murrysville, PA (US)

(73) Assignee: RJ Lee Group, Inc., Monroeville, PA (US)

( * ) Notice: Subject to any disclaimer, the term of this patent is extended or adjusted under 35 U.S.C. 154(b) by 317 days.

(21) Appl. No.: 15/717,264

(22) Filed: Sep. 27, 2017

(65) Prior Publication Data

US 2019/0091603 A1   Mar. 28, 2019

(51) Int. Cl.
 *B01D 1/00*  (2006.01)
 *B01D 3/14*  (2006.01)
 (Continued)

(52) U.S. Cl.
 CPC .............. *B01D 15/00* (2013.01); *B01D 1/00* (2013.01); *B01D 3/143* (2013.01); *B01D 3/148* (2013.01);
 (Continued)

(58) Field of Classification Search
 CPC ......... C10B 53/02; C10B 53/07; B01D 3/009; B01D 3/40; B01D 3/143; B01D 3/148; B01D 2257/7027; B01D 2256/24; B01D 17/0202; B01D 15/00; B01D 5/006; B01D 5/0057; B01D 1/00; C10G 21/14; C10G 21/28; C10G 21/00; C10G 25/003; C10G 25/12; C10G 53/04; C10G 53/08; C10G 2300/205; C10G 2300/44; C10G 2300/202; C10L 1/1802; C10L 2290/02; C10L 2290/544; C10K 1/04; C10K 1/08; C10K 1/18; C10C 5/00; C02F 1/288; C02F 1/52;
 (Continued)

(56) References Cited

U.S. PATENT DOCUMENTS 4,747,937 A    5/1988  Hilfman et al.
5,908,500 A *  6/1999  Brooks .................... B01J 20/12
                                                 106/287.17
(Continued)

FOREIGN PATENT DOCUMENTS

CN         102559232 A  *  7/2012

OTHER PUBLICATIONS

National Center for Biotechnology Information. PubChem Database. Hexane, CID=8058, https://pubchem.ncbi.nlm.nih.gov/compound/Hexane (accessed on Oct. 24, 2019).*
(Continued)

*Primary Examiner* — Benjamin L Lebron
(74) *Attorney, Agent, or Firm* — Eckert Seamans Cherin & Mellott, LLC; Arnold B. Silverman

(57) ABSTRACT

The present invention provides a method and apparatus for processing to improve the properties of pyrolysis oil and, as a result, the commercial value of the same. The net result is creation of an oil with a much lighter color in lieu of the black color, reducing or elimination the undesired sulfury/amine aroma and reducing the amount of PAH which is believed to be a carcinogen.

54 Claims, 3 Drawing Sheets

(51) Int. Cl.
| | |
|---|---|
| *B01D 5/00* | (2006.01) |
| *B01D 15/00* | (2006.01) |
| *B01D 17/02* | (2006.01) |
| *B01J 20/12* | (2006.01) |
| *B01J 20/34* | (2006.01) |
| *C10G 21/00* | (2006.01) |
| *C10G 21/14* | (2006.01) |
| *C10G 21/28* | (2006.01) |
| *C10G 25/00* | (2006.01) |
| *C10G 25/12* | (2006.01) |
| *C10G 53/04* | (2006.01) |
| *C10G 53/08* | (2006.01) |

(52) U.S. Cl.
CPC ......... *B01D 5/006* (2013.01); *B01D 17/0202* (2013.01); *B01J 20/12* (2013.01); *B01J 20/3475* (2013.01); *C10G 21/00* (2013.01); *C10G 21/14* (2013.01); *C10G 21/28* (2013.01); *C10G 25/003* (2013.01); *C10G 25/12* (2013.01); *C10G 53/04* (2013.01); *C10G 53/08* (2013.01); *C10G 2300/202* (2013.01); *C10G 2300/44* (2013.01)

(58) Field of Classification Search
CPC .. C02F 1/681; C02F 2101/20; C02F 2101/32; C02F 2305/12; B01J 2220/58; B01J 20/12; B01J 20/3475; B01J 20/28057; B01J 20/2808; B01J 20/3204; B01J 20/3242; B01J 20/186; B01J 20/28011; B01J 20/3248; B01J 20/3251; B01J 20/28004; B01J 20/16; B01J 20/3433; B01J 20/103

See application file for complete search history.

(56) References Cited

U.S. PATENT DOCUMENTS

| | | |
|---|---|---|
| 6,833,485 B2 | 12/2004 | Nichols et al. |
| 6,835,861 B2 | 12/2004 | Nichols et al. |
| 8,263,038 B2 | 9/2012 | Steinmeyer et al. |
| 8,512,462 B2 | 8/2013 | Matsui et al. |
| 8,512,643 B2 | 8/2013 | Steinmeyer et al. |
| 2003/0015473 A1 | 1/2003 | Murphy et al. |
| 2009/0306346 A1* | 12/2009 | Sohling .......... B01J 20/12 530/364 |
| 2009/0312176 A1 | 12/2009 | Osaheni et al. |
| 2012/0017493 A1 | 1/2012 | Traynor et al. |
| 2013/0334060 A1* | 12/2013 | Koseoglu .......... C25B 1/10 205/637 |
| 2014/0250774 A1 | 9/2014 | Asikkala et al. |
| 2014/0352204 A1 | 12/2014 | Belanger et al. |
| 2017/0265428 A1* | 9/2017 | Jiang .......... A01K 1/0155 |

OTHER PUBLICATIONS

Machine translation of CN 102559232.*
Mahfud et al. "Acetic Acid Recovery from Fast Pyrolysis Oil. An Exploratory Study on Liquid-Liquid Reactive Extraction using Aliphatic Tertiary Amines", Separation Science and Technology, vol. 43, Issue 11-12 (Jun. 2010), pp. 3056-3074.

* cited by examiner

METHODS AND APPARATUS FOR CLARIFICATION OF PYROLYSIS OILS

BACKGROUND OF THE INVENTION

1. Field of the Invention

The present invention relates to methods and apparatus for converting the black color of pyrolysis oil derived from thermal treatment of vehicle tires or other waste materials to a lighter more yellow color. It also relates to methods and apparatus for removing polar compounds from pyrolysis oil and reducing the polyaromatic hydrocarbons (PAH) levels in the pyrolysis oils.

2. Description of the Prior Art

It has been known to employ methods of pyrolysis of hydrocarbon materials such as waste vehicle tires to produce useful byproducts. This not only minimizes the problem of huge accumulations of discarded tires, but produces economically worthwhile products. See U.S. Pat. No. 6,833,485, for example. The pyrolysis process may produce a carbon product, a liquid hydrocarbon product and a combustible gas.

U.S. Pat. No. 6,835,861 discloses a low energy method of pyrolysis of hydrocarbon materials which employs a clay and metal catalyst. It produces a solid carbonaceous material, an oil and combustible gas products. The carbon black produced by the recited method was said to contain no detectable PAHs. The carbon char is said to be usable as a source of fuel. High purity carbon blacks were said to be usable for toner and electrical sensors. Liquid oil and gas is produced by the method are said to be easily separable from the system.

U.S. Pat. Nos. 8,263,038 and 8,512,643 recite a method of devolatilizing recycled carbon black obtained from the pyrolysis of tires by deagglomerating the recycled carbon black to reduce the black particle size and impinging a countercurrent air current on the black particles to increase the processing temperature and enhance release of volatiles.

Pyrolysis oil produced by heating rubber, such as tire rubber in the absence of oxygen, produce a black oil which has a strong sulfur and amine odor. Although the oil has an appearance much like crude oil, its composition is substantially different.

While both crude oil and pyrolysis oil contain pentane (C5), heptane (C7) and other alkane insolubles, the insolubles from crude oil consist of paraffins and asphaltenes. Insolubles from pyrolysis oil consist of polar compounds such as benzoic acid and oxygenates, sulfur and nitrogen compounds.

Tire pyrolysis oil has currently been used as a crude fuel or for down well application in order to clear oil well deposits. It has been known to collect fractions of the oil by distillation, but except for the fractions at the very light ends, the distillates are black and contain an objectionable sulfury/amine odor. It has been suggested that the black color was entrained carbon, however, when filtration was attempted in order to remove the black color, this was not successful.

In spite of the known prior art, there remains a very real and substantial need for solutions to the foregoing problems.

SUMMARY OF THE INVENTION

The method and apparatus of the present invention effectively reduces the undesired black color to a transparent dark amber and preferably to a transparent yellow which is more preferred with light transparent yellow being most preferred. The invention also effects a meaningful reduction in the undesired sulfury/amine odor. Finally, the preferred final product will have a reduction in the level of PAH's and be under 1 ppm of the PAH Benzo(a)pyrene.

The temperature range for removal of solvent from oil or clay residue is from the boiling point of the solvent up to about the boiling point of the oil fraction. For example, for hexane, when being used to process the unfractionated pyrolysis oil, the temperature range would be about 68° C. to 100° C. It has been found that exceeding the upper limit incurs an increase in the cost of the process without providing an offsetting comparable benefit. A preferred temperature range would be between 68° C. and 78° C. and the most preferred temperature range would be between 68° C. and 70° C.

It is an object of the present invention to provide a method and apparatus for efficiently clarifying pyrolysis oils.

It is a further object of the invention to provide an efficient and economical means for accomplishing such clarification.

It is yet another object of the invention to produce the desired transparent yellow color for the processed pyrolysis oil.

It is another object of the present invention to produce pyrolysis oil which does not have the objectionable sulfury/amine odor.

It is yet another object of the present invention to reduce the amount of PAH present in the processed oil.

It is yet another object of the present invention to provide a desirable light yellow color for the pyrolysis oil while eliminating the undesired sulfury/amine odor and reducing the PAHs in order to enhance the commercial value of the processed pyrolysis oil.

These and other objects of the invention will be readily apparent from the following detailed description and the appended claims.

DESCRIPTION OF THE PREFERRED EMBODIMENTS

Figure 1:
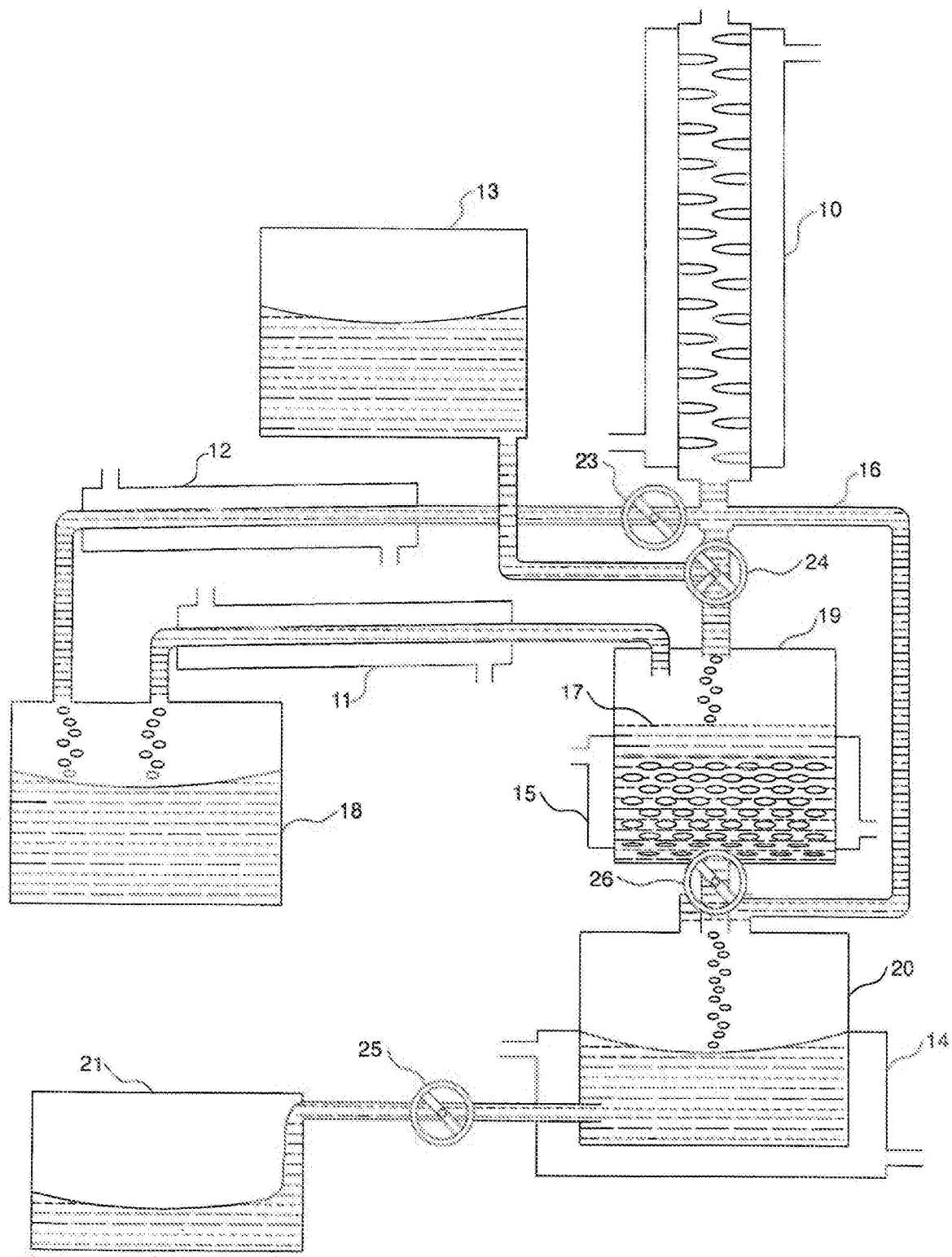
FIG. 1 is a schematic illustration of a form of apparatus employable in the present invention using a distillation-elution method.

The present invention provides methods and apparatus for removing the polar compounds. Removal is accomplished by adjustment of conditions such that the polar compounds bind to activated attapulgite which is also known as palygorskite. We have tried a number of other materials without meaningful success. These included but were not limited to bentonite, montmorillonite, activated carbon, charcoal, carbon black and diatomaceous earth, but were not successful in producing the desired result.

The invention also contemplates methods and apparatus for regenerating the clay with a polar solvent and then reactivating the same. Reactivation may be accomplished using the same apparatus and methods as for elution, but with the said polar solvent.

The method of the present invention involves initially adjusting the polarity of the unfractionated pyrolysis oil or pyrolysis oil fractions, absorption of the contaminants onto clay followed by elution and separation of the clean oil from the adjusting solvent.

The polarity may be adjusted by dilution with a non-polar solvent which may be an alkane or combination of several alkanes. The alkanes may be ones having 4 to 10 carbons (butane, pentane, hexane, heptane, octane, nonane or decane) and preferably pentane, hexane, and heptane (C5-C7) with hexane (C6) being the preferred alkane. If desired, combinations of two or more alkanes may be employed in the method.

The unwanted components are absorbed onto the attapulgite. These unwanted components include alkane-insolubles of polar compounds such as benzoic acid, quinolone, steric acid oxygenates, sulfur-containing compounds and nitrogen-containing compounds. The methods and apparatus of the present invention removes the polar compounds. This may be accomplished by precipitation and filtration or centrifugation of insolubles and binding of the polar compounds to activated attapulgite clay. The removal of the polar compound not only removes the black color and undesired odor, but the pyrolysis oil maintains its physical and chemical properties. This is followed by elution of the clean oil in the non-polar solvent. The solvent is then separated from the oil by evaporation. After that, the column is cleaned for reuse with a polar solvent such as acetone, methanol, tetrahydrofuran or dimethylformamide or other polar solvents, for example.

The heavier end of pyrolysis oil is known to contain various poly-aromatic hydrocarbons (PAHs) including benzo(a)pyrene which is the most carcinogenic of this compound group. It has been found that the present invention clarifies the oil color, reduces the odor, and has reduced levels of PAHs.

The method of the present invention involves removal, by precipitation and adsorption of the black material from the oil by using an alkane or alkane mixture selected from the group consisting of C4 through C10 (butane, pentane, hexane, heptane, octane, nonane and decane). The preferred alkane is one selected from the group consisting of alkanes C5 through C7 (pentane, hexane and heptane). The most preferred alkane is hexane.

The oil to be charged onto the column is diluted with an alkane solvent at a ratio of about 1:2 to 1:30 (oil to alkane) by volume and, preferably, of about 1:4 to 1:15 and, most preferably, of about 1:6 to 1:10. The diluted oil is aged by sitting at room temperature for at least 30 minutes to allow precipitation. The aged diluted oil can be filtered or centrifuged to remove precipitate prior to charging onto the column or it can be charged onto the column without removing precipitate. The oil is charged slowly onto the top of the bed and the fluid is collected from the bottom of the column. For example; this could involve approximately 0.22 liters per hour of column flow per liter of void volume (using a column with approximately 18.2-liter void volume is equivalent to 4 liters per hour column flow). The range of flow rates is about 0.1 to 0.6 liters per hour of column flow per liter of void volume, a preferred range would be about 0.2 to 0.4 liters per hour of column flow per liter of void volume and a most preferred range would be about 0.3 to 3.5 liters per hour of column flow per liter of void volume.

The ratio of clay to oil to be clarified is in the range of about 4:1 to 20:1 by weight, or preferably about 6:1 to 15:1 by weight and, most preferably, about 6:1 to 10:1 by weight. The greater weight enhances recovery.

Figure 2:
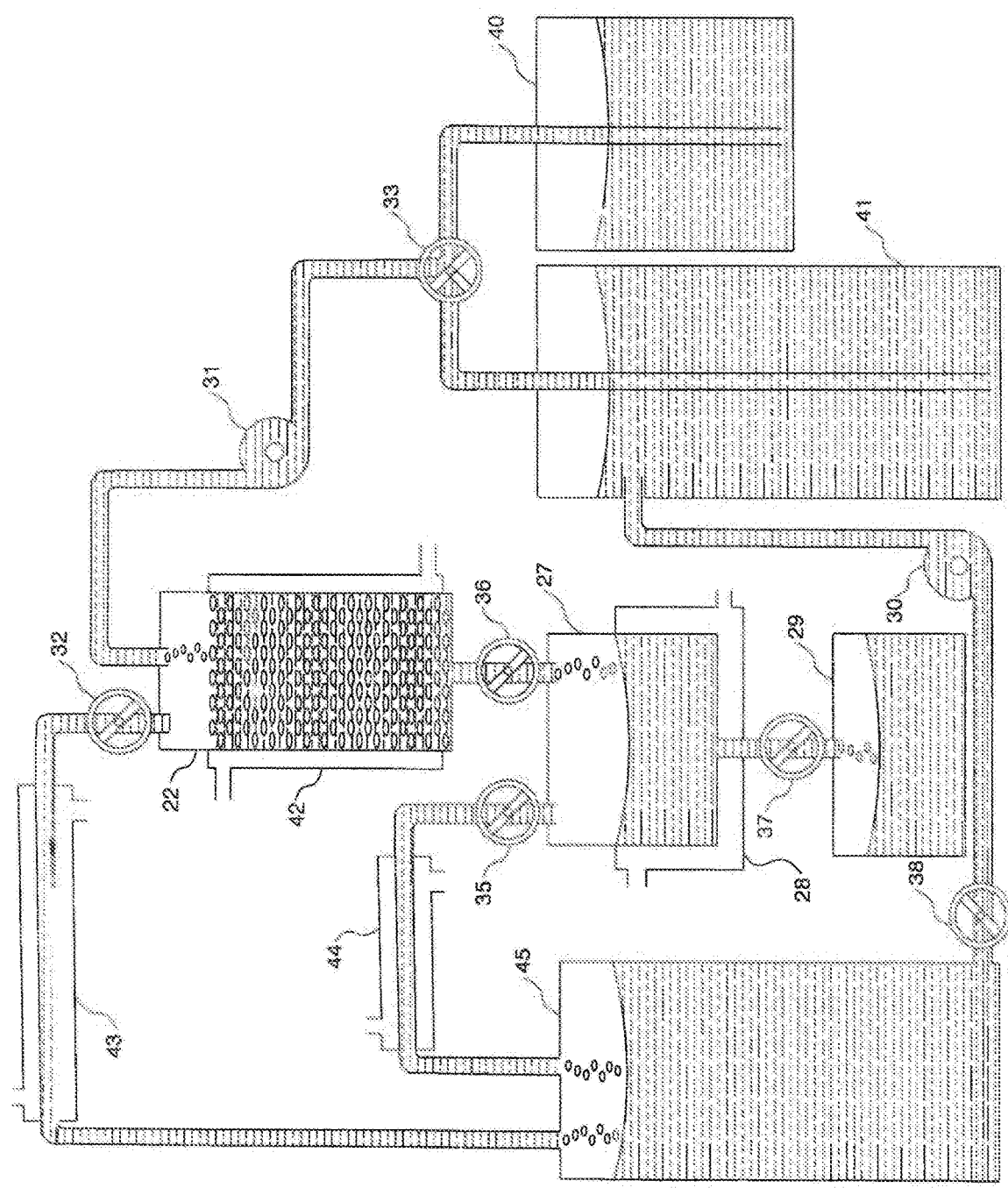
FIG. 2 is a schematic illustration of a form of apparatus employable in the present invention employing a forced flow-elution method.

FIG. 1 illustrates an alternate method (referred to herein as "distillation-elution method") of processing the pyrolysis oil which method is slightly preferred over the forced-flow-elution method to be described herein in connection with FIG. 2. One advantage over the forced-flow-elution method is that the distillation-elution method uses less solvent and, therefore, can be more advantageously employed economically.

While both the methods and apparatus of FIGS. 1 and 2 will effectively practice the present invention, there is a preference for FIG. 1. The distillation-elution method and apparatus (shown in FIG. 1) employs less solvent to elute material from the column in the elution phase and employs less wash solvent in the wash phase. Also, since the column is eluted and washed with distilled solvent, it typically operates at a higher temperature than the forced-flow-elution method. This results in eluting and washing at greater efficiencies.

With respect to eluting oil, there are two effective alternate procedures for washing the column. In an example of the first method, hexane is delivered to the top of the bed by means, for example, of a pump and is allowed to migrate down by gravity. The flow is controlled through the columns at approximately 4 liters per hour washing the bed with up to 30 bed volumes using a valve at the bottom of the column. The eluent contains extracted oil and hexane. The oil and hexane is collected in a vessel and separated from each other by distillation at a temperature sufficient to evaporate hexane (68° C.) but not high enough to evaporate the oil. The recovered oil is recovered at the distillation bottoms. The column is then washed and prepared for the next cycle of operation.

In an example of the second elution process, freshly distilled hexane is delivered to the top of the column using a distillation system where the eluent bottom of the column is heated at a temperature sufficient to evaporate hexane (68° C.), but not high enough to evaporate the oil.

The evaporation temperatures for a particular solvent being employed for elution or cleaning and for a particular pyrolysis oil fraction are (1) between the boiling point of the particular solvent and 32° C. above the boiling point of the most volatile compound in the particular pyrolysis oil fraction or (2) preferably, between the boiling point of the particular solvent and 10° C. above the boiling point of the most volatile compound in the oil fraction or (3) most preferably, between the boiling point of the particular solvent and 2° C. above the boiling point of the most volatile compound in the oil fraction.

For example, for hexane being used to clarify unfractionated pyrolysis oil the ranges would be (1) between 68° C. to 100° C. or (2) preferably between 68° C. and 78° C. or (3) most preferably, between 68° C. and 70° C. The ranges for other alkanes will be known to those skilled in the art and can readily be determined.

In this manner, solvent is delivered to the top of the column continuously. The flow is controlled through the column at approximately 4 liters per hour, washing the bed with up to 30 bed volumes using valve at the bottom of the column.

The difference between this process and a known standard column chromatography process is our distillation-elution method employed less solvent and higher temperature. Soxhlet is used to continuously soak a solid, in our case clay, to remove bound or captured material. It does not flow the solvent through the material in a top down fashion as is required for chromatography, thus, it is not appropriate for our process. In another process, fiber thimbles permit the residue to flow out to the sides of the crucible. This brings a portion of the extract to the bottom of the vessel without residence time with clay thereby minimizing contact therebetween.

Our process has been found to be more effective for removal of the polar substances from the oil and polar substances from the column during cleanup.

An example of a cycle of operation of the system of FIG. 1 will be considered. The system shown in FIG. 1 employs evaporation and gravity in order to deliver solutions and uses about 10 to 15 times less solvent than the forced-flow elution method shown in FIG. 2 to be described hereinafter. In order to achieve the same degree of purification in this example of the distillation-elution method, the oil and hexane are mixed at most preferably a 1:6 to 1:10 ratio of oil to hexane prior to charging onto the column. The oil and hexane are mixed in vessel 13 and is allowed to sit for about two or more hours. Solids that precipitate in vessel 13 may be removed by filtration or centrifugation or can be left suspended in this fluid. The liquid is fed by gravity through valve 24 to column 17 at approximately the rate of 0.22 liters per hour of column flow per liter of void volume. The bottom valve 26 remains closed for about 1 to 2 hours contact time. Valve 26 is opened and a volume of hexane equivalent to the oil and hexane mix in tank 20 is maintained at a boiling temperature by heat exchanger 14 which is at least 68° C. for hexane. The hexane vapors travel through tube 16 and are condensed by condenser 10. The condensed hexane drips through valve 24 and on to and through column 17 and then from valve 26 into tank 20. The flow is preferably controlled at about 0.1 to 0.6 liters per hour of column flow per liter of void volume using valve 26. The oil elution process is complete after about 10 to 30 column bed volumes of hexane have been eluted through column 17.

At this point valve 23 is opened and valve 24 and 26 are closed. The contents of tank 20 are heated to at least 68° C. to remove the hexane completely by evaporation from tank 20. In the case of hexane, it is evaporated from tank 20, passes through tube 16 through open valve 23 and is condensed by condensers 10 and 12 for delivery to tank 18. Product oil 20 is then drained through valve 25 into tank 21. After that, valve 25 is closed and tank 21 is replaced with a clean tank. The residual hexane is removed from the clay by closing valves 24 and 26 to isolate the column (17) and heating the column using heat exchanger 15 to evaporate residual hexane through condenser 11 and into tank 18.

The column is then cleaned with a polar solvent. The preferred solvent for cleaning the clay is acetone. In the case of acetone, it is transferred into tank 20 while valves 23, 25 and 26 are in the closed position. Valve 24 is open to the condenser 10. Tank 20 is heated to the boiling point of acetone using exchanger 14. The acetone from tank 20 evaporates and passes through tube 16, after which it is condensed in condenser 10 and drips through valve 24 and onto and through column 17. The bottom valve 26 is open to allow dripping into tank 20. This is continued for about 30 bed volumes (the volume of clay in the column is a bed volume). Tanks 18 and 21 are replaced with clean tanks for this part of the process. Valves 24 and 26 are closed and valve 23 is open. Tank 20 continues to be heated until the acetone is completely evaporated. The acetone vapors travel through tube 16 and are condensed through condensers 10 and 12. Recovered acetone is collected in tank 18. The waste material collected in tank 20 is drained through valve 25 into tank 21 for disposal or alternate use. The tanks are then cleaned and are ready for their initial set up for the processing of the next batch.

FIG. 2 illustrates schematically an example of a forced-elution apparatus usable in the method of the present invention. In this example, a ratio of oil to hexane of 1:16 is employed. The oil-hexane mixture is in vessel 40 and is allowed to sit for about two hours. Solids that precipitate in the vessel 40 may be removed by either filtration or centrifugation or can be left suspended in this fluid. The liquid is pumped through valve 33 by pump 31 and onto column 22. The oil is pumped slowly onto the top of the bed and fluid is collected from the bottom of the column 22 at approximately 0.22 liters per hour of column flow per liter of void volume (using a column with approximately an 18.2 liters void volume which is equivalent to 4 liter per hour column flow). Once the material is charged onto the column 22, the column bottom valve 36 is closed for about 1 to 2 hours to allow sufficient contact time between the liquid and the clay. Valve 36 is then opened and valve 33 is turned open to allow hexane from tank 41 to be pumped by means of pump 31 onto the column 22 at a rate of approximately 0.22 liters per hour of column flow per liter of void volume (using a column with approximately an 18.2 liter void volume which is equivalent to 4 liters per hour column flow.) The column is then washed with about 30 times the volume of oil-hexane that was charged into the column of hexane from tank 41 with valve 36 open, 37 closed and valve 35 in the open position and into tank 27. Tank 27 is heated to approximately 68° C. by heating jacket 28 and vapors condensed by condenser 44. Hexane is collected in tank 45 until only oil remains in tank 27. The cleaned oil is then delivered though valve 37 into tank 29. Valves 33, 35, 36, 37 are closed with valve 32 being open. Jacket 42 is heated and jacket 43 is cooled to allow the residual hexane to be removed from the column 22 and the clay to be dried. Tank 45 will hold all recovered hexane which ultimately will be pumped through valve 38 by pump 30 to tank 41 for reuse.

The evaporation temperatures for a particular solvent being employed for elution or cleaning and for a particular pyrolysis oil fraction is (1) between the boiling point of the particular solvent and 32° C. above the boiling point of the most volatile compound in the particular pyrolysis oil fraction or (2) preferably, between the boiling point of the particular solvent and 10° C. above the boiling point of the most volatile compound in the oil fraction or (3) most preferably, between the boiling point of the particular solvent and 2° C. above the boiling point of the most volatile compound in the oil fraction.

For example, for hexane being used to clarify unfractionated pyrolysis oil, the ranges would be (1) between 68° C. to 100° C. or (2) preferably between 68° C. and 78° C. or (3) most preferably, between 68° C. and 70° C.

A column bed that could treat four liters of oil employed in an example test was approximately 18 inches in diameter and 24 inches high and have a capacity of approximately 34 liters. The bed was filled with about 16 Kg of clay which is approximately 32 liters and was wet with approximately 20 liters of hexane. The column distribution consisted of screen plates and glass wool at the top and at the bottom with a valve at the bottom to control flow.

As shown in FIG. 2, valve 38 is opened and the contents of tank 45 is pumped through pump 30 into tank 41. When the transfer is complete, valve 38 is closed. Tank 41 is replaced with a tank containing acetone. Acetone from tank 41 is pumped though valve 33 using pump 31 and is delivered into column 22. The acetone extracts the material in column 22 and delivers it through open valve 36 into tank 27.

The material collected in tank 27 is evaporated to collect acetone into tank 45. Vapors passing through open valve 35 are condensed by cooling jacket 44 with the acetone being collected until only waste residue remains in tank 27. The temperature ranges for the wash procedure are as described hereinbefore. Waste material from tank 27 is drained through valve 37 to tank 29 for disposal or alternate use. The tanks are then replenished to the initial setup conditions for the next cycle of operation.

Figure 3:
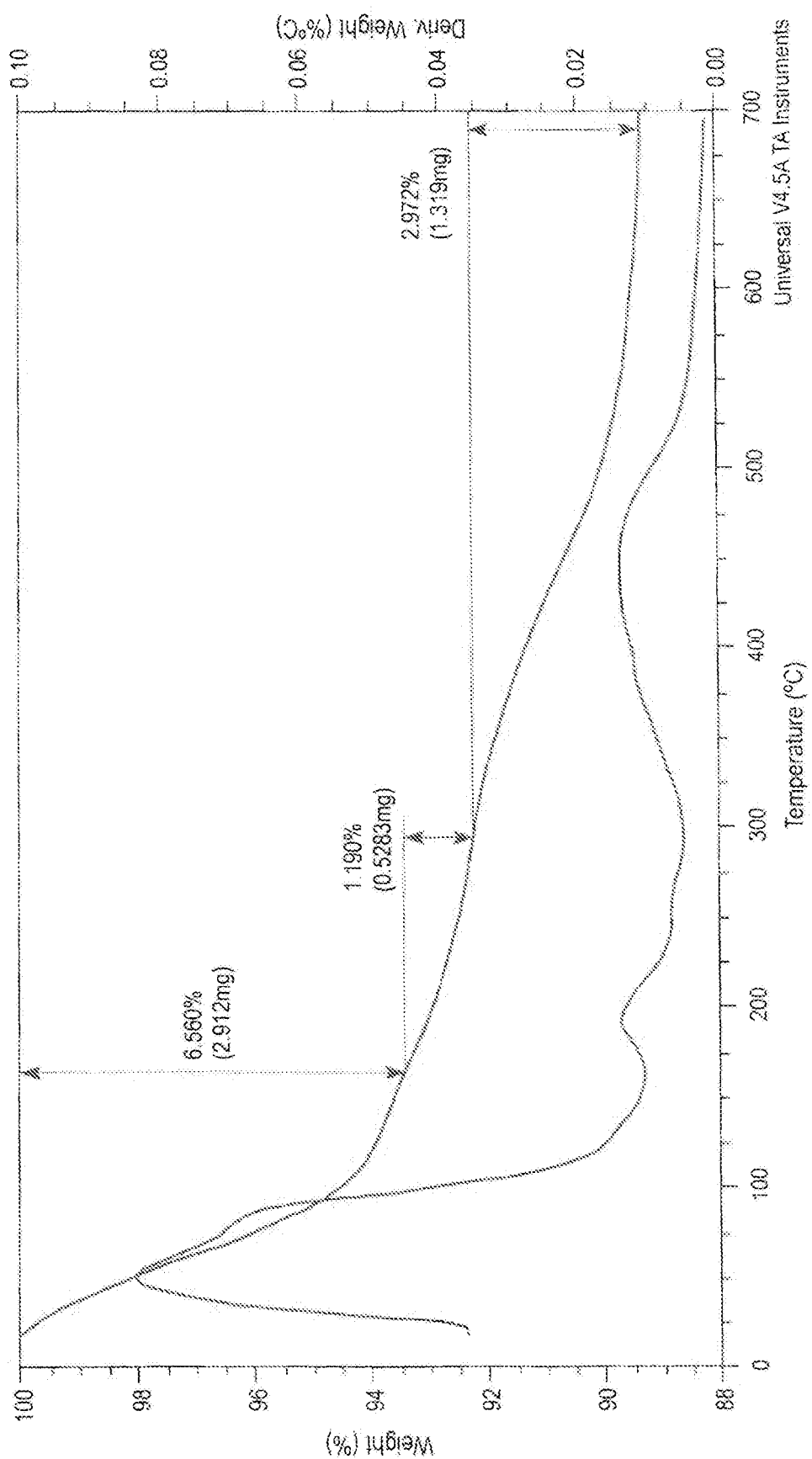
FIG. 3 is a plot of weight percent versus temperature versus derivative weight percent showing the relationships in drying clay.

We have found that the attapulgite clay works more efficiently after being activated. Activation may be accomplished by drying it at 150° C. until there is no weight change. Referring to FIG. 3, we were able to reach the appropriate temperature using a TGA with a ramp rate of 10° C./minute to 700° C. Although the clay can be dried above 150° C., clay tends to decompose at that temperature and loses much of its capacity. FIG. 3 shows the results of Thermogravimetric analysis (TGA) of the attapulgite testing showing the percent weight loss as a function of temperature. This profile shows the temperature at which free water and hydrated waters evolve. We have found that driving off the higher temperature hydration waters decreases capacity of the clay for the clarification residues.

In cleaning the clay for reuse, it is preferred to use a polar solvent such as selected from the group consisting of acetone, methanol, tetrahydrofuran, dimethyl-formamide or another solvent suitable for the purpose. At present, acetone is our preferred polar solvent for this purpose. In cleaning, the flow is controlled through the column at approximately 4 liters per hour washing the bed with up to 30 bed volumes using the valve at the bottom of the column.

After the process has been completed, the clay may be regenerated by washing with a polar solvent.

While the preferred alkanes are ones having 4 to 10 carbons, it will be appreciated that they may be employed individually, in the process, hexane and butane, for example, may be employed in combinations. Also, while for purposes of directing hexane, the preferred alkane has been used individually, other alkanes within the preferred group having 4 to 10 carbons may be employed individually.

Whereas particular embodiments of the invention have been described for purposes of illustration, it will be evident to those skilled in the art that numerous variations of the details of the present invention may be made departing from the invention as defined in the appended claims.

What is claimed is:

1. A method of processing pyrolysis oil comprising
   adjusting the polarity of said pyrolysis oil with a non-polar solvent,
   effecting separation of insoluble components from said pyrolysis oil,
   binding insoluble components to clay,
   combining said pyrolysis oil with said non-polar solvent, and
   separating the non-polar solvent from the pyrolysis oil.
2. The method of claim 1 including
   employing an alkane as said non-polar solvent.
3. The method of claim 2 including
   wherein the alkane is selected from the group consisting alkanes having 4 to 10 carbons.
4. The method of claim 2 including
   employing a mixture of two or more alkanes selected from the group consisting of alkanes having 4 to 10 carbons.
5. The method of claim 2 including
   Employing as said an alkane selected from the group consisting of alkanes having 5 to 7 carbons.
6. The method of claim 2 including
   employing hexane as said alkane.
7. The method of claim 2 including
   mixing said pyrolysis oil and alkane to adjust polarity.
8. The method of claim 7 including
   mixing said pyrolysis oil and alkane in a ratio of pyrolysis oil to alkane to about 1:2 to 1:30.
9. The method of claim 7 including
   mixing said pyrolysis oil and alkane preferably in a ratio of pyrolysis oil to alkane to about 1:4 to 1:15.
10. The method of claim 7 including
    mixing said pyrolysis oil and alkane in a ratio of pyrolysis oil to alkane to about 1:6 to 1:10.
11. The method of claim 7 including
    after mixing said pyrolysis oil and alkane allowing the mixture to sit for at least 30 minutes to allow precipitation of said insoluble components.
12. The method of claim 1 including
    effecting said separation of said non-polar solvent from said pyrolysis oil by evaporation.
13. The method of claim 1 including
    employing attapulgite as said clay.
14. The method of claim 1 including
    prior to a cycle of said method activating said clay.
15. The method of claim 1 including
    said ratio of clay to pyrolysis oil being about 4:1 to 20:1 by weight.
16. The method of claim 1 including
    said ratio of clay to pyrolysis oil being about 6:1 to 15:1 by weight.
17. The method of claim 1 including
    cleaning said clay before performing a next cycle of said processing of said pyrolysis oil.
18. The method of claim 17 including
    employing a polar solvent to clean said clay.
19. The method of claim 18 including
    employing acetone as said clay cleaning polar solvent.
20. The method of claim 18 including
    employing as said clay cleaning polar solvent a material selected from the group consisting of methanol, tetrahydrofuran and dimethylformamide.
21. The method of claim 1 including
    employing a column in performing the processing of said binding insoluble components to clay.
22. The method of claim 21 including
    employing hexane as said alkane in said pyrolysis oil and alkane mixture.
23. The method of claim 22 including
    creating flow of said pyrolysis oil-alkane mixture through said column at the rate of about 0.1 to 0.6 liters per hour of column flow per liter of column void volume.
24. The method of claim 21 including
    employing hexane as said alkane in said pyrolysis oil and alkane mixture, and
    creating flow of said mixture through said column at the rate of about 0.2 to 0.4 liters per hour of column flow per liter of column void volume.
25. The method of claim 21 including,
    employing hexane as said alkane in said pyrolysis oil and alkane mixture, and
    creating flow of said mixture through said column at the rate of about 0.3 to 3.5 liters per hour of column flow per liter of column void volume.

26. The method of claim 1 including
effecting said separation of said non-polar solvent from said pyrolysis oil by heating said mixture to a temperature high enough to evaporate said non-polar solvent but not high enough to evaporate said pyrolysis oil.

27. The method of claim 1 including
effecting said separation of said non-polar solvent from said pyrolysis oil by heating said mixture to between the boiling point of the non-polar solvent and 32° C. above the boiling point of the most volatile compound in the pyrolysis oil fraction.

28. The method of claim 1 including
effecting said separation of said non-polar solvent from said pyrolysis oil by heating said mixture to between the boiling point of the non-polar solvent and 10° C. above the boiling point of the most volatile compound in the pyrolysis oil fraction.

29. The method of claim 1 including
effecting said separation of said non-polar solvent from said pyrolysis oil by heating said mixture to between the boiling point of the non-polar solvent and 2° C. above the boiling point of the most volatile compound in the pyrolysis oil fraction.

30. The method of claim 20 including
employing hexane as said non-polar solvent and heating said mixture to between 68° C. to 100° C. to evaporate said hexane.

31. The method of claim 20 including
employing hexane as said non-polar solvent and heating said mixture to between 68° C. and 78° C. to evaporate said hexane.

32. The method of claim 1 including,
effecting said processing by employing a distillation-elution method.

33. The method of claim 1 including,
effecting said processing by forced flow elution methods.

34. The method of claim 12 including
condensing said evaporated alkane,
introducing said condensed alkane into a first vessel,
said pyrolysis oil being in a second vessel, and
said second vessel being substantially alkane free.

35. The method of claim 14 including
regenerating said clay with a polar solvent, and
reactivating said regenerated clay.

36. Apparatus for processing pyrolysis oils according to the method of claim 1 comprising
a first vessel for receiving a mixture of said pyrolysis oil and a non-polar solvent,
a heater for evaporating said non-polar solvent in said first vessel, and
a first condenser for receiving said evaporated non-polar solvent and condensing the same.

37. The apparatus of claim 36 including
a clay column for receiving condensed vapors from said condenser and eluting said non-polar solvent therefrom into a second vessel.

38. The apparatus of claim 36 including
said apparatus structured to deliver said evaporated non-polar solvent to a second vessel leaving said pyrolysis oil in said first vessel.

39. The apparatus of claim 38 including
said first vessel structured to receive substantially all of said pyrolysis oil and to be substantially devoid of said non-polar solvent.

40. The apparatus of claim 36 including
said apparatus structured to clean said clay column after a cycle of operation.

41. The apparatus of claim 40 including
said apparatus structured to employ acetone as said clay cleaning polar solvent.

42. The apparatus of claim 36 including
said apparatus structured to process non-polar solvents which are alkanes having 4 to 10 carbons.

43. The apparatus of claim 41 including
said apparatus structured to process hexane.

44. The apparatus of claim 36 including
said apparatus structured to function as distillation apparatus in processing said pyrolysis oil.

45. The apparatus of claim 36 including
said apparatus being employable in both the processing of said pyrolysis oils and the cleaning of said apparatus after a cycle of operation.

46. An apparatus for processing pyrolysis oils according to the method of claim 1 comprising
a first vessel for holding a mixture of said pyrolysis oil and a non-polar solvent,
a clay column for receipt of said mixture,
a second vessel for receiving said mixture passing through said clay column,
said second vessel structured to heat said mixture to a temperature at which said non-polar-solvent will vaporize,
a condenser for condensing said vapors, and
a third vessel for receipt of said condensed vapors until only pyrolysis oil remains in said second vessel.

47. The apparatus of claim 46 including
said apparatus structured to process non-polar solvents which are alkanes having 4 to 10 carbons.

48. The apparatus of claim 46 including
said apparatus structured to process a non-polar solvent which is hexane.

49. The apparatus of claim 46 including
said apparatus structured to process a plurality of non-polar solvents which are alkanes having 4 to 10 carbons simultaneously.

50. The apparatus of claim 46 including
delivery means for delivering a clay cleaning material to said clay column after a cycle of operation.

51. The apparatus of claim 50 including
said clay cleaning material being acetone.

52. The apparatus of claim 50 including
said clay being attapulgite.

53. The apparatus of claim 52 including
said apparatus structured to activate said clay before performing a next cycle of said processing of pyrolysis oil.

54. The apparatus of claim 53 including
said apparatus structured to effect said activation by drying said clay at at least 150° C. until there is no more weight loss.

* * * * *